(12) United States Patent
Phelps et al.

(10) Patent No.: US 6,915,450 B2
(45) Date of Patent: Jul. 5, 2005

(54) METHOD AND APPARATUS FOR ARBITRATING TRANSACTIONS BETWEEN DOMAINS IN A COMPUTER SYSTEM

(75) Inventors: Andrew E. Phelps, Encinitas, CA (US); Thomas P. Van Wormer, Oceanside, CA (US); Gary L. Riddle, Poway, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 698 days.

(21) Appl. No.: 10/034,919

(22) Filed: Nov. 1, 2001

(65) Prior Publication Data

US 2003/0084373 A1 May 1, 2003

(51) Int. Cl.[7] .................................................. G06F 11/00
(52) U.S. Cl. ........................................ 714/16; 709/224
(58) Field of Search ................................ 714/16, 15, 18, 714/20, 21, 32, 39, 43; 709/224, 212, 213, 223

(56) References Cited

U.S. PATENT DOCUMENTS

| | | | |
|---|---|---|---|
| 5,084,816 A | * 1/1992 | Boese et al. ................... 714/4 |
| 5,392,291 A | 2/1995 | Berkovich et al. | |
| 5,440,538 A | 8/1995 | Olsen | |
| 5,448,721 A | 9/1995 | Kaneko | |
| 5,457,683 A | * 10/1995 | Robins ....................... 370/258 |
| 5,509,125 A | 4/1996 | Johnson et al. | |
| 5,590,124 A | * 12/1996 | Robins ....................... 370/258 |
| 5,761,445 A | 6/1998 | Nguyen | |
| 5,805,822 A | 9/1998 | Long et al. | |
| 6,161,160 A | 12/2000 | Niu et al. | |
| 6,308,211 B1 | * 10/2001 | Rosborough et al. ....... 709/224 |
| 2002/0133758 A1 | * 9/2002 | Quan et al. .................... 714/51 |
| 2003/0061534 A1 | * 3/2003 | Drogichen et al. ........... 714/10 |

FOREIGN PATENT DOCUMENTS

EP 0848327 6/1998

OTHER PUBLICATIONS

International search report application No. PCT/US02/35097 mailed Mar. 28, 2003.

* cited by examiner

*Primary Examiner*—Nadeem Iqbal
(74) *Attorney, Agent, or Firm*—Meyertons Hood Kivlin Kowert & Goetzel, P.C.; B. Noël Kivlin (57) ABSTRACT

A method for communicating transactions includes providing an interconnect having a plurality of ports for communicating transactions between a plurality of domains in a computing system is provided. Each port is associated with a subset of the domains. The interconnect includes a first signal path for transmitting a first portion of the transaction and a second signal path for transmitting a second portion of the transaction. A transaction issued from a port associated with more than one of the domains is identified. An error in one of the first and second portions of the transaction is identified. The transaction is canceled responsive to identifying the error. A computing system for communicating transactions includes first and second devices. The first device is adapted to receive a first portion of a transaction. The second device is adapted to receive a second portion of the transaction in lockstep with respect to the first device. The first and second devices are further configured to identify an error in one of the first and second portions of the transaction, respectively, and the one of the first and second devices that identifies the error is further configured to send a notification signal to the device associated with the other of the first and second portions of the transaction responsive to identifying the error.

36 Claims, 5 Drawing Sheets

METHOD AND APPARATUS FOR ARBITRATING TRANSACTIONS BETWEEN DOMAINS IN A COMPUTER SYSTEM

BACKGROUND OF THE INVENTION

1. Field of the Invention

This invention relates generally to computer systems, and, more particularly, to a method and apparatus for arbitrating transactions between domains in a computer system.

2. Description of the Related Art

Network computing has increased dramatically over the past several years due in part to the emergence of the Internet. Some trends in the industry include a significant growth in Applications Service Providers (ASPs) that provide applications to businesses over networks that use the Internet to distribute product data to customers, take orders, and enhance communications between employees, for example.

Typically, businesses rely on network computing to maintain a competitive advantage over other businesses. As such, developers typically take several factors into consideration to meet the customer's expectation when designing processor-based systems for use in network environments. Such factors, for example, may include functionality, reliability, scalability and the performance of these systems.

One example of a processor-based system used in a network environment is a mid-range server system. A single mid-range server system may be configured for a plurality of operating domains, where a domain may act as a separate machine by running its own instance of an operating system to perform one or more of the configured tasks.

The benefits of providing substantially independently operating system domains within an integrated system become readily apparent as customers are able to perform a variety of tasks that would otherwise be reserved for several different machines. However, managing a plurality of system domains within a system sometimes proves to be a challenging task, as designers of such systems have a finite number of resources to build a functioning system that also meets customer demands. For example, managing one or more system domains in a system may consume valuable hardware resources that could otherwise be used to deliver additional features to the customers.

To enhance the availability of the processor-based system, redundant hardware may be provided. If one component fails, its redundant counterpart may be configured to take over its functions in the system. If the system were configured to use only one of two redundant components at any time until a failure occurs, the processing potential of the unused component would be unrealized.

The present invention is directed to overcoming, or at least reducing the effects of, one or more of the problems set forth above.

SUMMARY OF THE INVENTION

One aspect of the present invention is seen in a method for communicating transactions. The method includes providing an interconnect having a plurality of ports for communicating transactions between a plurality of domains in a computing system. Each port is associated with a subset of the domains. The interconnect includes a first signal path for transmitting a first portion of the transaction and a second signal path for transmitting a second portion of the transaction. A transaction issued from a port associated with more than one of the domains is identified. An error in one of the first and second portions of the transaction is identified. The transaction is canceled responsive to identifying the error.

Another aspect of the present invention is seen in a computing system for communicating transactions that includes first and second devices. The first device is adapted to receive a first portion of a transaction. The second device is adapted to receive a second portion of the transaction in lockstep with respect to the first device. The first and second devices are further configured to identify an error in one of the first and second portions of the transaction, respectively, and the one of the first and second devices that identifies the error is further configured to send a notification signal to the device associated with the other of the first and second portions of the transaction responsive to identifying the error.

BRIEF DESCRIPTION OF THE DRAWINGS

The invention may be understood by reference to the following description taken in conjunction with the accompanying drawings, in which like reference numerals identify like elements, and in which:

FIG. 3A to FIG. 3E illustrate various aspects of signal paths in the computing system of FIGS. 1 and 2 in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
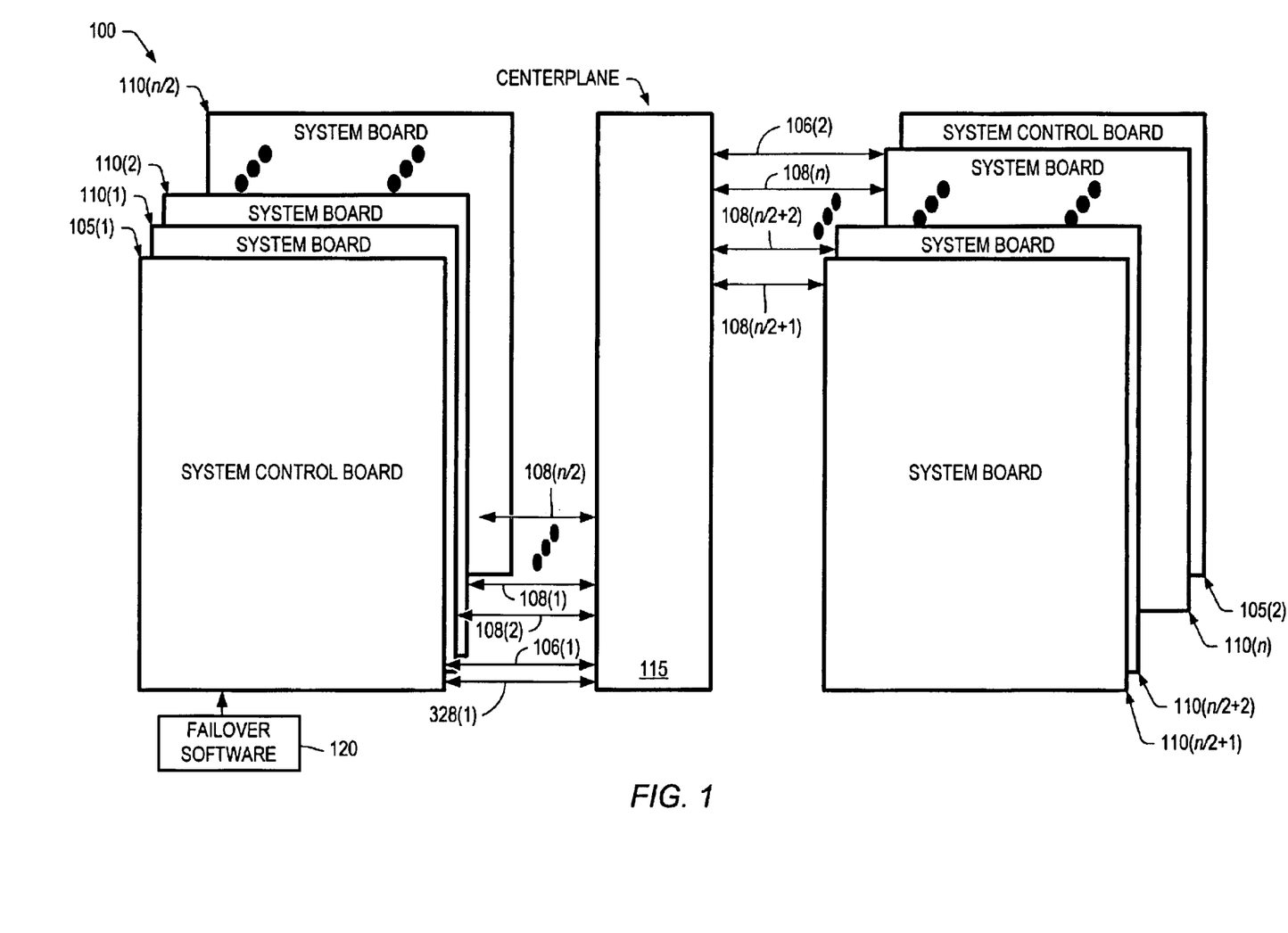
FIG. 1 shows a stylized block diagram of a computing system in accordance with one embodiment of the present invention.

Referring now to FIG. 1, a block diagram of a computing system 100 in accordance with one embodiment of the present invention is illustrated. The computing system 100 includes a plurality of system control boards 105(1), 105(2)

and a plurality of system boards 110(1)–110(n) coupled to a centerplane 115. For illustrative purposes, lines 106(1–2) and lines 108(1)–108(n) are utilized to show that the system control boards 105(1), 105(2) and system boards 110(1)–110(n), respectively, are coupled to the centerplane 115. However, as will be appreciated by those skilled in the art having the benefit of this disclosure, the system control boards 105(1), 105(2) and system boards 110(1)–110(n) may be coupled to the centerplane 115 in any of a variety of ways. These ways include, but are not limited to, edge connectors, cables, or other available interfaces. The system boards 110(1)–110(n) may interface with the centerplane 115 using the same technique as the system control boards 105(1), 105(2), but this is not necessary to the practice of the invention. The system control boards 105(1), 105(2) and the system board sets 110(1)–110(n) may be connected to the centerplane 115 using different types of interfaces.

In the illustrated embodiment, one of the control boards 105(1), 105(2) manages the overall operation of the computing system 100, and the other provides redundancy and automatic failover in the event that the first board fails. Although invention is not so limited, in the illustrated embodiment, the first system control board 105(1) serves as a "main" system control board, while the second system control board 105(2) serves as an alternate, hot-swap, replaceable system control board. During any given moment, generally one of the two system control boards 105(1), 105(2) actively controls the overall operations of the computing system 100. Accordingly, the term "active system control board," as utilized hereinafter, may refer to either one of the system control boards 105(1), 105(2), depending on which board is managing the operations of the computing system 100 at that moment. Note, however, that some embodiments may employ only a single system control board 115(1).

The centerplane 115 serves as a communications conduit for the system boards 110(1)–110(n), half of which may be connected on one side of the centerplane 115 and the other half on the opposite side of the centerplane 115. In the illustrated embodiment, the centerplane 115 includes an n×n crossbar that allows up to n system boards 110(1)–110(n) and the system control boards 105(1), 105(2) to communicate with one another, if desired. In one particular embodiment, n=18. Thus, the centerplane 115 may allow the two system control boards 105(1), 105(2) to communicate with each other or with other system boards 110(1)14 110(n), as well as allow the system boards 110(1)–110(n) to communicate with each other.

Figure 2:
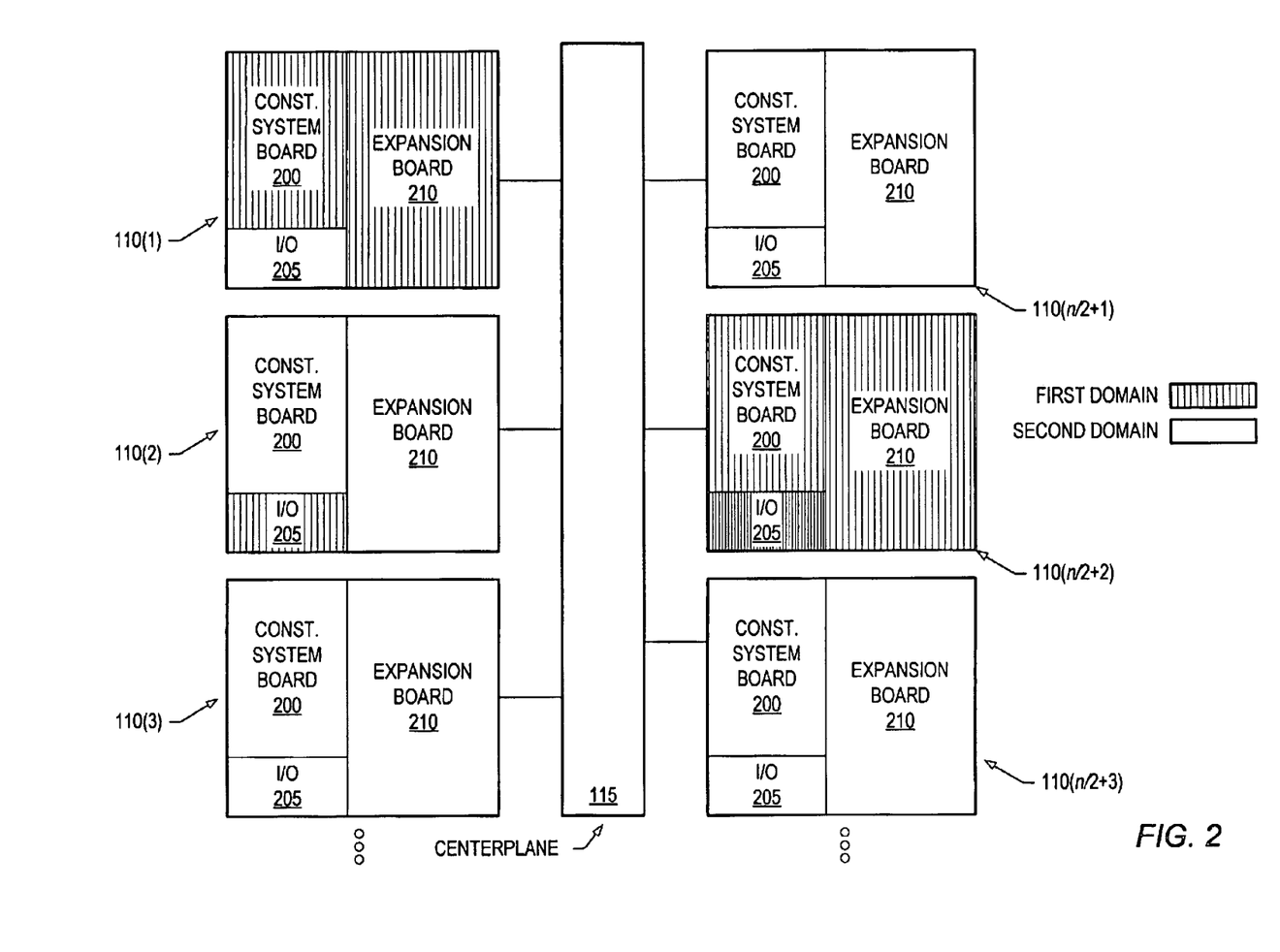
FIG. 2 illustrates a block diagram of an exemplary system domain configuration that may be employed in the system of FIG. 1, in accordance with one embodiment of the present invention.

Turning now to FIG. 2, each system board 110(1)–110(n), in the illustrated embodiment, comprise one or more boards, including a constituent system board 200, an input/output (I/O) board 205, and an expansion board 210. Thus, each of the system boards 110(1)–110(n) is a board "set." Note that alternative embodiments might not employ board sets or, alternatively, employ board sets with differing numbers of constituent boards. As those in the art having the benefit of this disclosure will appreciate, the functionality of one or more of the constituent system board 200, I/O board 205, and expansion board 210 might be incorporated onto a single board. Conversely, that functionality may be spread across any number of boards that can be interconnected in the manner shown. Thus, the number of constituent boards in the board sets 110(1)–110(n) may range from 1 on up to any number. Again, as those in the art having the benefit of this disclosure will appreciate, there is a practical upper bound to this number. The upper bound generally arises from the fact that greater numbers of boards tend to degrade performance, complicate serviceability, and compromise reliability. However, this is an implementation specific concern. From the standpoint of the invention, the number of boards in the board sets 110(1)–110(n) is immaterial.

The constituent system board 200 may include processors (not shown), as well as memories (also not shown), for executing applications, including portions of an operating system. The processors may be, for example, UltraSPARC™ 64-bit processors available from Sun Microsystems, any of the Itanium™, Pentium™, or Alpha™-class processor from Intel Corporation, or the Athlon™ or Duron™-class processors from Advanced Micro Devices, Inc. In one particular implementation, the computing system 100 employs an UNIX™-based operating system (e.g., a Solaris™ OS) commercially available from the assignee of this application, Sun Microsystems, Inc. However, the invention may be employed with virtually any operating system. The I/O board 205 may manage I/O cards, such as peripheral component interface cards (not shown) and optical cards (also not shown), that are installed in the computing system 100.

The expansion board 210, in the illustrated embodiment, generally acts as a multiplexer (e.g., 2:1 multiplexer) to allow both the system and I/O boards 200, 205 to interface with the centerplane 115, which, in some instances, may have only one slot for interfacing with both boards 200, 205.

In the illustrated embodiment, the computing system 100 is dynamically subdivided into a plurality of system domains, where each domain may have a separate boot disk (to execute a specific instance of the operating system, for example), separate disk storage, network interfaces, and/or I/O interfaces. System domains are a mix of I/O assemblies and CPU/memory resources. System domains are isolated from failures (e.g., operating system errors, software errors, CPU/memory failures, I/O assembly failures) in other system domains. Each domain may operate as a separate machine that performs a variety of user-configured services. For example, one or more domains may be designated as an application server, a web server, database server, and the like. Each domain may run its own operating system and may be reconfigured without interrupting the operation of other domains. The subdivision is handled dynamically in the illustrated embodiment, as is discussed further below, although the invention is not so limited.

FIG. 2 illustrates an exemplary arrangement wherein at least two domains are defined in the computing system 100 in the illustrated embodiment. The first domain, identified by vertical cross-sectional lines, includes the system board 110(n/2+2), the constituent system board 200 of the system board 110(1), and the I/O board 205 of the system board 110(2). The second domain in the illustrated embodiment includes the system boards 110(3), 110(n/2+1), and 110(n/2+3), as well as the I/O board 205 of the system board 110(1) and the constituent system board 200 of the system board 110(2).

A domain may be formed of an entire system board 110(1)–110(n), one or more boards (e.g., constituent system board 200, I/O board 205) from selected system boards 110(1)–110(n), or a combination thereof. Although not necessary, it may be possible to define each system board 110(1)–110(n) as a separate domain. For example, if each system board 110(1)–110(n) were its own domain, the computing system 100 may conceivably have up to "n" (i.e., the number of system boards) different domains. When two boards (e.g., constituent system board 200, I/O board 205) from the same system board 110(1)–110(n) are in different domains, such a configuration is referred to as a "split expander" configuration. The expansion board 210 of the system boards 110(1)–110(n) keep the transactions separate for each domain. Physical proximity is not required for boards in a system domain. The split expander configuration is described in greater detail in U.S. patent application Ser. No. 09/963,082, entitled "METHOD AND APPARATUS FOR PROVIDING ERROR ISOLATION IN A MULTI-DOMAIN COMPUTER SYSTEM" in the names of Donald Kane, Steven E. Weiss, Eric Graf, and Andrew Phelps.

Note, however, that the invention is not limited to computing systems in which the formation of system domains is performed dynamically. For example, some embodiments may restrict the allocation of system resources to various system domains only upon reset of the entire computing system. Furthermore, resources may be allocated to system domains either manually or automatically, i.e., under the automated control of one or more of the system control boards 105(1), 105(2). The manner in which system domains are created, deleted and the manner in which resources are allocated or re-allocated to existing system domains is not material to the practice of the present invention.

Figures 3A, 3E:
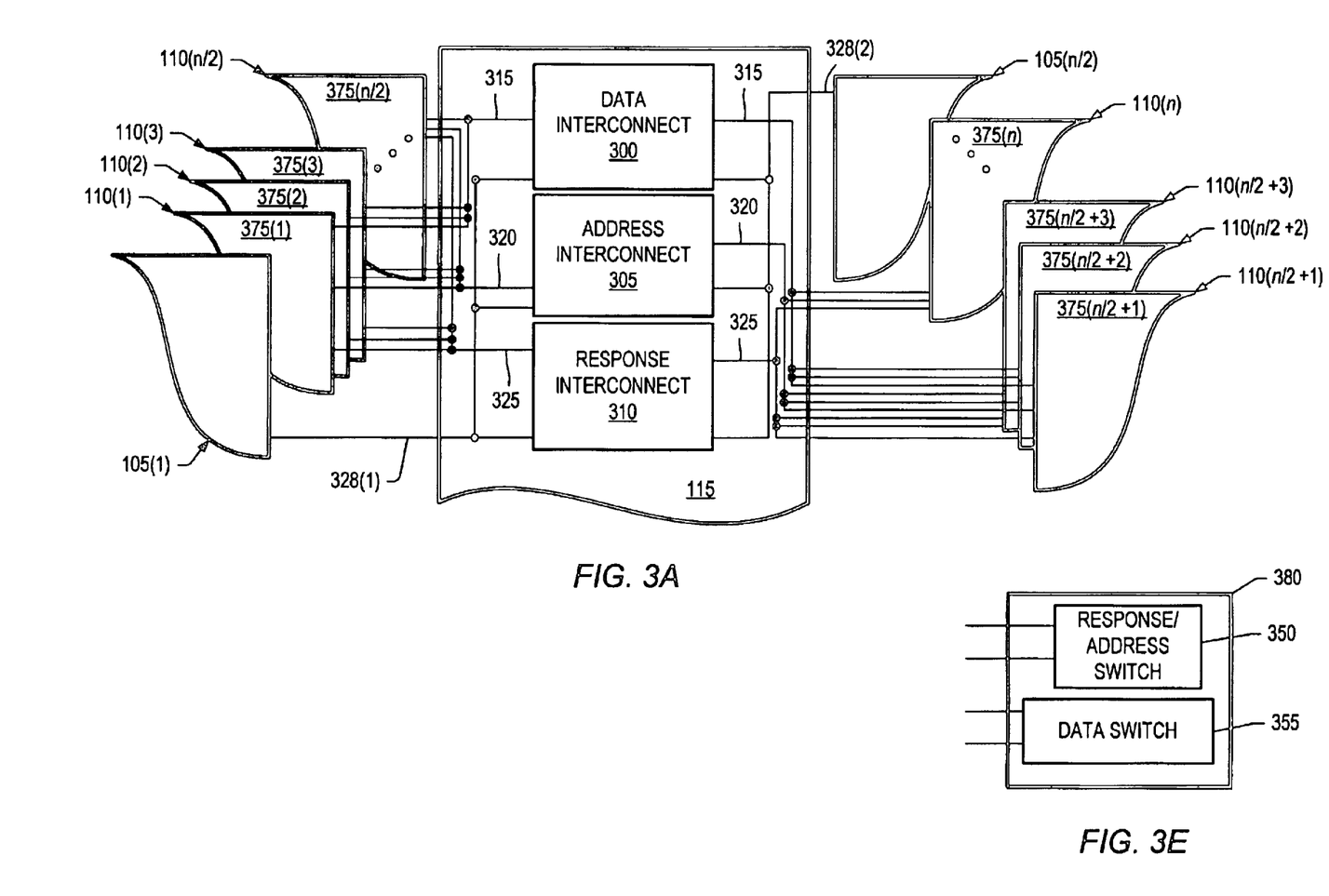

Returning to FIG. 1, communications between system boards 110(1)–110(n) are performed through the centerplane 115. As shown in FIG. 3A, the centerplane 115, in the illustrated embodiment, includes a data interconnect 300, an address interconnect 305, and a response interconnect 310 for transmitting respective data, address, and response signals among the system domains defined from the system boards 110(1)–110(n). More particularly, the data interconnect 300 and the lines 315 comprise a data signal path; the address interconnect 305 and the lines 320 comprise an address signal path; and, the response interconnect 310 and the lines 325 comprise a response signal path. Thus, the centerplane 115 includes three interconnects 300, 305, 310 that provide a separate data path, address path, and response signal path to allow intra-domain and inter-domain communications.

In FIG. 3A there are actually multiple point-to-point connections between the system boards 110(1)–110(n) and the interconnects 300, 305, 310. The signal paths illustrated in FIG. 3A are collections of many individual signal paths. Each individual signal path is many bits wide. For instance, in one particular embodiment, the data path is 288-bits wide, the address path is 148-bits wide, and the response path is 66-bits wide. Thus, each line 315, 320, 325 is many bits wide. Each individual signal path comprises two halves.

In its "normal" mode of operation, the computing system 100 divides the information for any given transaction into two messages and transmits the two messages in parallel on the two halves of the respective individual signal path. For example, the payload of a data transaction may be split into two portions, with one payload portion being sent on each half of the signal path. The control information for each half of the transaction is the same for both halves of the transaction. In the illustrated embodiment, the control information is protected with parity checking and the payload information is protected with error checking and correcting (ECC) code to allow for single bit error corrections and double bit error detections.

In accordance with the invention, the computing system 100 enters a "degraded mode" upon a failure of one half of the signal path. In the degraded mode of the illustrated embodiment, all of the information is transmitted in a single message on a single half of the path. While this takes twice as many cycles as in normal mode, the computing system 100, including that part in which the failure occurs, is still available until the fault can be repaired.

As is shown in FIG. 3A, the system control boards 105(1) and 105(2) are not on the data, address, or response signal paths. The system control boards 105(1) and 105(2) instead connect to the interconnects 300, 305, 310 on console connections 328(1) and 328(2), respectively. The system control boards 105(1) and 105(2) configure the interconnects 300, 305, 310 over the console connections 328(1), 328(2), in a manner more fully described below.

Figure 3B:
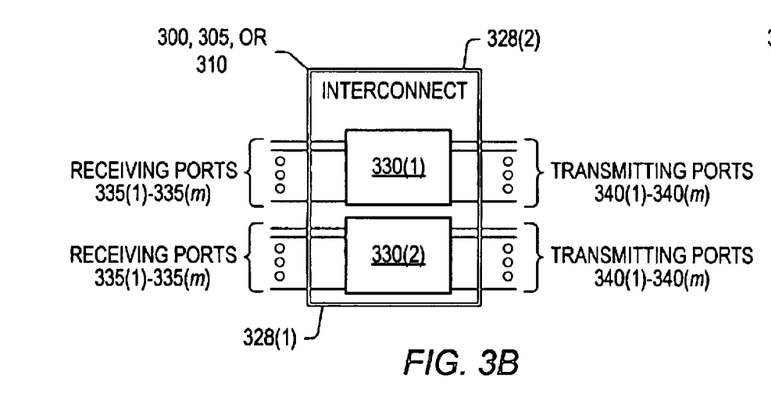

Turning now to FIG. 3B, each interconnect 300, 305, 310, includes two halves 330(1), 330(2). Each half 330(1), 330(2) is implemented by one or more ASICs (not shown) and has m receiving ports 335(1)–335(m) and m transmitting ports 340(1)–340(m), where m is the number of expansion boards 210 in the computing system 100. Thus, if there are 18 expansion boards, each half 330 would include 18 receiving ports 335 and 18 transmitting ports 340. Each of the ports 335(1)–335(m), 340(1)–340(m) is half as many bits wide as the individual signal path, as each half 330(1), 320(2) handles information on half the individual signal path.

Figure 3C:
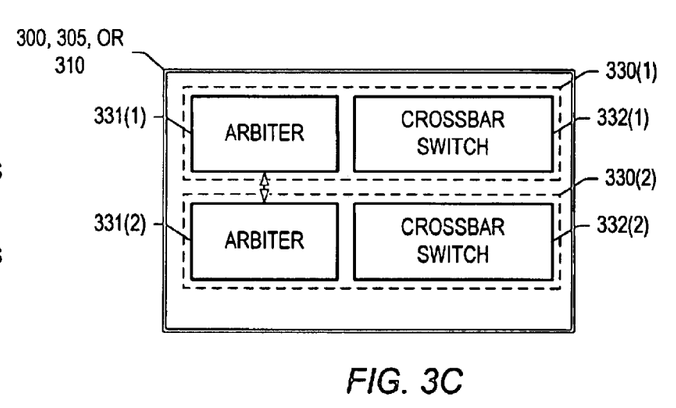

As seen in FIG. 3C, each half 330(1), 330(2) includes an arbiter 331(1), 331(2), and a crossbar switch 332(1), 332(2), respectively. The arbiters 331(1), 331(2) operate in a lock-step manner to retain synchronicity so that the message halves will be delivered to their destinations in the proper order. Consider, for the sake of illustration, an individual data signal path 345, shown in FIG. 3D, between a switch 380, on the expansion board 210 of the system board 110(1) and the switch 380 on the expansion board 210 of the system board 110(n). Each expansion board 210, in this particular embodiment, includes a switch 380 through which transactions are sent and received in a manner discussed more fully below. Address and response signal paths are structured similarly except for obvious changes, e.g., the address interconnect 305 is used instead of the data interconnect 300.

As shown in FIG. 3E, each switch 380 includes an address/response switch 350 and a data switch 355 that handles information received over the respective response, data, and address signal paths. Thus, the switch 380 handles all signal path transactions for its respective system board 110(1)–110(n). Note that the number of these switches in the switch 380 is not material to the invention. For example, in some embodiments any number from 1 to 3 may be employed. The response/address switch 350 and the data switch 355 are implemented in ASICs (not shown) that are also configurable over the console connections 328(1), 328(2).

Returning to FIG. 3D, the individual data signal path 345 comprises a first half 360(1) and a second half 360(2). When the computing system 100 operates in a normal mode, the information for any given transaction is separated into two portions, each packaged with a common header including control information in a respective message. Each message is then transmitted over a respective half 360(1), 360(2) of the individual data signal path 345 (including a respective half 330(1), 330(2) of the data interconnect 300) from one switch 380 to the other switch 380.

Figure 3D:
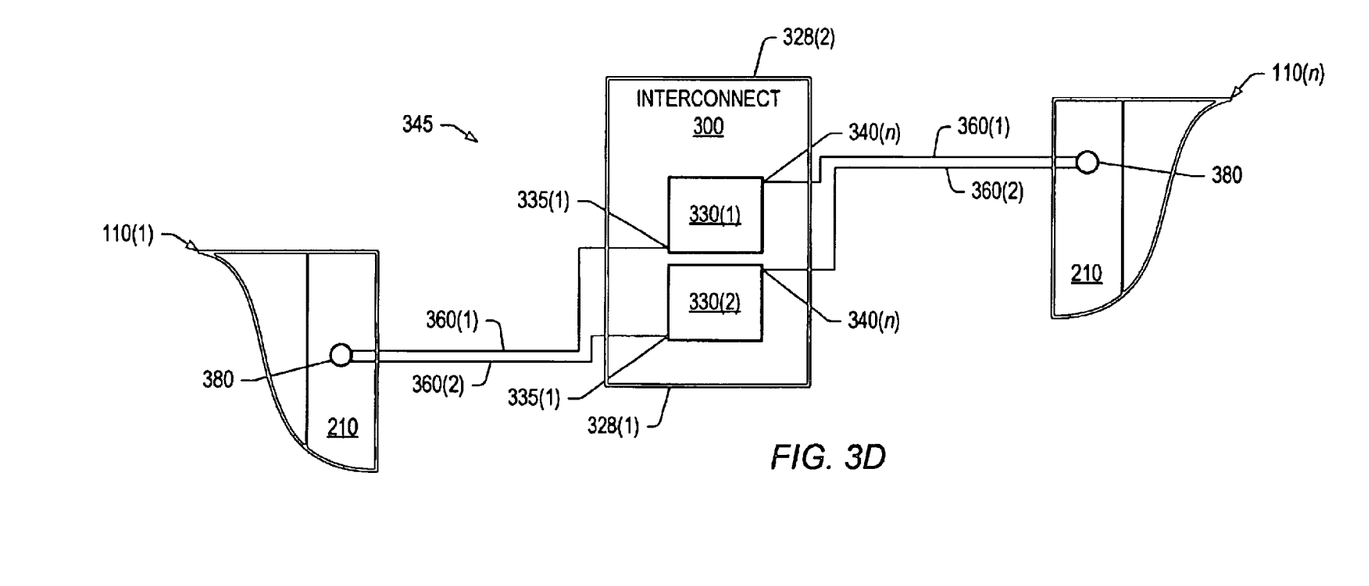

The number and type of signal paths, e.g., the data individual data signal path 345 in FIG. 3D, is implementation specific. In the illustrated embodiment, there are three separate kinds of signal paths, i.e., data, address and response. There is one signal path of each kind between each expansion board 210 of each system board 110(1). Thus, there are (3×n×n) signal paths in the illustrated embodiment.

In one implementation, n=1, yielding a total of 972 signal paths. However, the number may vary depending on the number of kinds of signal paths and the number of expansion boards 210.

Note that, in the illustrated embodiment, the computing system 100 has a symmetrical physical arrangement. That is, half of the system boards 110(1)–110(n) are physically located on one side of the centerplane 115, and the other half of the system boards 110(1)–110(n) are physically located on the opposite side of the centerplane 115. In one particular implementation, n=18, so that system boards 110(1)–110(9) are of one side of the centerplane 115 and system boards 110(10)–110(18) are on the other. Additionally, in the illustrated embodiment, the first system control board 105(1) and the second system control board 105(2) are diagonally positioned from each other relative to the centerplane 115. The symmetrical positioning of the boards 105(1), 105(2), 110(1)–110(n) in the illustrated manner may take advantage of the interface connections on both sides of the centerplane 115. However, the invention is not limited to computing systems employing a symmetrical physical arrangement. Thus, in some alternative embodiments, the physical arrangement of the system control boards 105(1), 105(2), the centerplane 115, and the system boards 110(1)–110(n) may be asymmetrical.

Returning to FIG. 3C, the switches 380 route the two halves of a transaction to each of the arbiters 331(1), 331(2) over the paths 360(1), 360(2), respectively. This routing is referred to as bit-slicing the transaction. In a bit-slicing arrangement, any two or more components that handle portions of the same transaction must act on those portions in the same way at the same time. This simultaneous action is termed lockstep operation. For transactions that cross domains, it is possible that an error in a transaction in one domain may result in the loss of the lockstep operation of the arbiters 331(1), 331(2) with respect to the ports 335(1)–335 (m), 340(1)–340(m) used by another domain. Accordingly, in cases where transactions are received on ports 335(1) –335(m) that are shared by more than one domain, an additional check is made to prevent a hardware failure in one domain that results in an errant transaction from causing a problem in another domain due to loss of lockstep. This monitoring of ports 335(1)–335(m) shared among different domains provides additional separation of the domains with respect to fault tolerance. Shared-domain ports 335(1)–335 (m) include ports 335(1)–335(m) that are authorized to communicate transactions to more than one domain. Transactions issuing from ports 335(1)–335(m) associated with a split expander are also treated as issuing from shared-domain ports 335(1)–335(m), because the constituent system board 200 and I/O board 205 reside in different domains, and it is not readily apparent whether an individual transaction at the split expander will cross domains.

Because the transactions are bit-sliced and sent in parallel over the paths 360(1), 360(2), it is possible that one of the transaction halves may have an error in the control information. If the non-errant portion of the transaction was allowed to post and the errant portion was inhibited, the arbiters 331(1), 331(2) would no longer be in lockstep with one another. The loss of lockstep could affect other domains in the computing system 100.

Consider a system configuration having three domains A, B, and C. An error in a transaction originating from a split expander associated with domains A and B may result in the loss of lockstep for all ports 335(1)–335(m) associated with domains A and B. Another split expander may be associated with domains B and C. The loss of lockstep for the ports 335(1)–335(m) associated with domains A and B would eventually spread to domain C due to the second split expander. Thus, all ports 335(1)–335(m) associated with domain C could then lose lockstep.

To detect problems with transactions that could affect multiple domains, the arbiters 331(1), 331(2) impose a two-cycle delay for all transactions associated with shared-domain ports 335(1)–335(m) so that they may perform an error check. The arbiters 331(1), 331(2) exchange colleague notification signals to communicate a failed error check. In the illustrated embodiment, the arbiters 331(1), 331(2) perform a parity check on the control information associated with each half of the transaction. Parity checks allow for detection of errors, but not correction. The payload portion of the transaction is protected with ECC code so errors in the payload may be detected and possibly corrected downstream without compromising other domains. However, errant control information does have the potential to affect other domains, so any transactions with errors in the control information are not posted to the crossbar switches 332(1), 332(2).

The delay allows the arbiters 331(1), 331(2) to check transactions from shared-domain ports 335(1)–335(m) for parity before the transactions are acted upon. The arbiters 331(1), 331(2), drop the transaction if either half is found to be in error. If either arbiter 331(1), 331(2) detects a parity error in the control information, it sends a colleague notification signal to the other arbiter 331(1), 331(2). If both arbiters 331(1), 331(2) detect a parity error, they both send colleague notification signals.

Upon receipt of a colleague notification signal from another arbiter 331(1), 331(2), both arbiters 331(1), 331(2) drop the current transaction and block the port that issued the errant transactions from issuing any further transactions. Each port on the interconnect 300, 305, 310 has an associated mask that specifies which of the other ports it may access. The arbiters 331(1), 331(2) may disable further transactions from the port associated with the errant transaction by setting the mask for all other ports such that the errant port is blocked.

In the illustrated embodiment, the colleague notification signal is a serial bit-stream consisting of two start bits, both ones, a five bit binary port number identifier, and a three bit check-sum. The checksum is the binary sum of the start bits and the port number. The checksum does not exceed six. Each arbiter 331(1), 331(2) sends two copies of this signal, in phase, to its colleague. Since more than one port in an arbiter 331(1), 331(2) can request access to colleague notification at a time, the notification circuits may implement an arbitration function that selectively allows one port at a time to originate a serial notify.

The receiving arbiter 331(1), 331(2) will immediately pause when the first bit of a colleague notification signal is seen to be a one. Thereafter, the pause is held by the receiving circuits until the serial notify can be decoded. When the port of interest is decoded and the checksum found valid, the pause to all domains is released, and the affected domain is directed to perform a stop command. The affected port also flushes the offending transaction by not allowing it to be pushed into a receive buffer, and/or by not allowing it to request arbitration service.

Upon receipt of a colleague notification message, the arbiters 331(1), 331(2) check each of the two serial bit-streams for a good notify, and then compare the two notifies. A good notify has the following characteristics:

Two start bits in a row, both ones;

A legal 5-bit port number; legal=0x00000 through 0x10001; and

A 3-bit checksum equal to the checksum of the above;

Following identification of a valid notification event, the arbiter 331(1), 331(2) that identified the error sends an error message to the system control board 105(1), 105(2) to allow for further error processing. The system control board 105(1), 105(2) may also dynamically reconfigure the computing system 100 in view of the disabled port.

Figure 4:
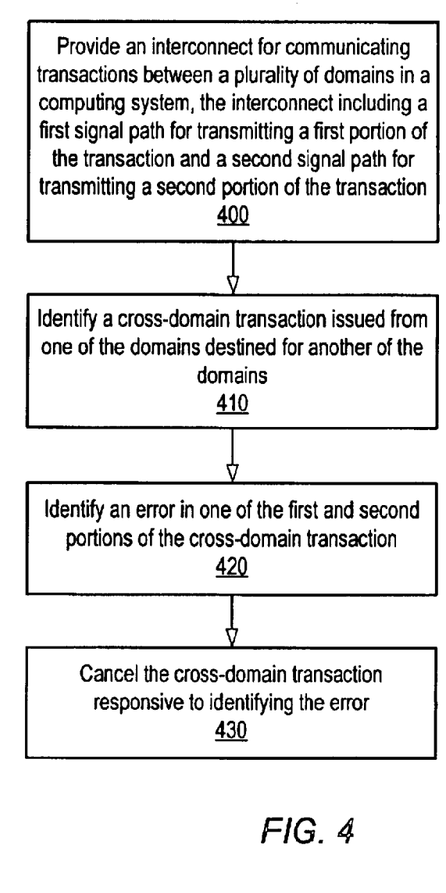
FIG. 4 illustrates a simplified block diagram of a method for arbitrating transactions between domains in a computer system in accordance with one embodiment of the present invention.

Turning now to FIG. 4, a simplified block diagram of a method for arbitrating transactions between domains in a computer system in accordance with one embodiment of the present invention is shown. In block 400, an interconnect having a plurality of ports for communicating transactions between a plurality of domains in a computing system is provided. Each port is associated with a subset of the domains. The interconnect includes a first signal path for transmitting a first portion of the transaction and a second signal path for transmitting a second portion of the transaction. In block 410 a transaction issued from one of ports associated with more than one of the domains is identified. In block 420, an error in one of the first and second portions of the transaction is identified. In block 430 the transaction is canceled responsive to identifying the error.

Identifying errors in transactions issuing from shared-domain ports 335(1)–335(m) and preventing such transactions from being acted upon improves the stability of the computing system 100. Such oversight increases the robustness of individual domains, as they are less susceptible to faults in other domains.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   providing an interconnect having a plurality of ports for communicating transactions between a plurality of domains in a computing system, the ports each being associated with a subset of the domains and the interconnect including a first signal path for transmitting a first portion of the transaction and a second signal path for transmitting a second portion of the transaction;
   identifying a transaction issued from one of ports associated with more than one of the domains;
   identifying an error in one of the first and second portions of the transaction; and
   canceling the transaction responsive to identifying the error.

2. The method of claim 1, wherein the first and second portions of the transaction include control information and payload information, the control information for the first and second portions being the same, and the payload information for the first and second portions being different, and wherein identifying the error in the method further comprises identifying an error in the control information of the first and second portions.

3. The method of claim 1, wherein identifying the error further comprises performing a parity check.

4. The method of claim 1, wherein the first and second portions of the transaction each include control information, and identifying the error further comprises performing a parity check on the control information for the first and second portions.

5. The method of claim 1, wherein the interconnect further comprises a first arbiter associated with the first signal path and a second arbiter associated with the second signal path, and the method further comprises, responsive to identifying the error in one of the first and second portions of the transaction, sending a notification signal to the one of the first and second arbiters associated with the other of the first and second portions of the transaction.

6. The method of claim 1, further comprising inhibiting future transactions from being issued from the port that originated the errant transaction.

7. The method of claim 1, further comprising pausing the transaction prior to identifying the error.

8. A method for communicating transactions, comprising:
   receiving a first portion of a transaction in a first device;
   receiving a second portion of the transaction in a second device in lockstep with respect to the first device;
   identifying an error in one of the first and second portions of the transaction; and
   notifying the device associated with the other of the first and second portions of the transaction responsive to identifying the error.

9. The method of claim 8, further comprising canceling the transaction responsive to notifying the other device.

10. The method of claim 8, wherein the first and second portions of the transaction include control information and payload information, the control information for the first and second portions being the same, and the payload information for the first and second portions being different, and wherein identifying the error in the method further comprises identifying an error in the control information of the first and second portions.

11. The method of claim 8, wherein identifying the error further comprises performing a parity check.

12. The method of claim 8, wherein the first and second portions of the transaction each include control information, and identifying the error further comprises performing a parity check on the control information for the first and second portions.

13. The method of claim 8, further comprising:
   providing a port for issuing the transaction to the first and second devices; and
   inhibiting future transactions from being issued from the port that originated the transaction responsive to the notification signal.

14. The method of claim 8, further comprising pausing the transaction in the first and second devices prior to identifying the error.

15. A computing system, comprising:
   a plurality of system domains;
   an interconnect having a plurality of ports for communicating between the system domains, the interconnect including a first signal path for transmitting a first portion of a transaction and a second signal path for transmitting a second portion of the transaction;
   a first arbiter associated with the first signal path and being configured to identify a transaction issued from a port associated with more than one of the domains and detect an error in the first portion of the transaction; and
   a second arbiter associated with the second signal path and being configured to identify an error in the second portion of the transaction issued from the port associated with more than one of the domains;

wherein the first and second arbiters are adapted to cancel the transaction responsive to identifying the error in either of the first and second portions of the transaction.

16. The system of claim 15, wherein the first and second portions of the transaction include control information and payload information, the control information for the first and second portions being the same, and the payload information for the first and second portions being different, and wherein the first and second arbiters are configured to identify errors in the control information of the first and second portions, respectively.

17. The system of claim 15, wherein the first and second arbiters are configured to perform a parity check.

18. The system of claim 15, wherein the first and second portions of the transaction each include control information, and the first and second arbiters are configured to perform a parity check on the control information for the first and second portions.

19. The system of claim 15, wherein one of the first and second arbiters, responsive to identifying the error in one of the first and second portions of the transaction, is further configured to send a notification signal to the other of the first and second arbiters.

20. The system of claim 15, wherein the first and second arbiters are further configured to inhibit future transactions from being issued from the port that originated the errant transaction.

21. The system of claim 15, wherein the first and second arbiters are adapted to pause the transaction issued from the port associated with more than one of the domains prior to identifying the errors.

22. A computing system for communicating transactions, comprising:

a first device adapted to receive a first portion of a transaction; and a second device adapted to receive a second portion of the transaction in lockstep with respect to the first device, wherein the first and second devices are further configured to identify an error in one of the first and second portions of the transaction, respectively, and the one of the first and second devices that identifies the error is further configured to send a notification signal to the device associated with the other of the first and second portions of the transaction responsive to identifying the error.

23. The system of claim 22, wherein the first and second devices are further configured to cancel the transaction responsive to the notification signal.

24. The system of claim 22, wherein the first and second portions of the transaction include control information and payload information, the control information for the first and second portions being the same, and the payload information for the first and second portions being different, and the first and second devices are further configured to identify the error in the control information of the first and second portions, respectively.

25. The system of claim 22, wherein the first and second devices are further configured to perform a parity check on the first and second portions, respectively.

26. The system of claim 22, wherein the first and second portions of the transaction each include control information, and the first and second devices are further configured to identify the error by performing a parity check on the control information for the first and second portions, respectively.

27. The system of claim 22, wherein the first and second devices are adapted to pause the transaction prior to identifying the error.

28. A computing system, comprising:

a first system domain;

a second system domain; and an interconnect between the first and second system domains, the interconnect comprising two halves, each half transmitting a portion of a transaction between the first and second domains, and being configured to error check the two portions and cancel the transaction if an error is identified.

29. The system of claim 28, wherein the transaction includes control information and payload information, the control information for the portion associated with the first half and the portion associated with the second half being the same, and the payload information for the portion associated with the first half and the portion associated with the second half being different, and wherein the interconnect is configured to identify errors in the control information of the portions.

30. The system of claim 28, wherein the interconnect is configured to perform a parity check on the portions.

31. The system of claim 28, wherein the transaction includes control information, and the interconnect is configured to perform a parity check on the control information for the portion associated with the first half and the portion associated with the second half.

32. The system of claim 28, wherein one of the first and second halves, responsive to identifying the error, is further configured to notify the other half.

33. The system of claim 28, wherein the interconnection includes at least one port for originating the transaction, and the first and second halves are further configured to inhibit future transactions from being issued from the port that originated the transaction.

34. The system of claim 28, wherein the interconnect is adapted to pause the transaction prior to identifying the errors.

35. A system, comprising:

means for communicating transactions between a plurality of domains in a computing system including first means for transmitting a first portion of the transaction and second means for transmitting a second portion of the transaction;

means for identifying an error in one of the first and second portions of the transaction; and means for canceling the transaction responsive to identifying the error.

36. A system, comprising:

means for receiving a first portion of a transaction;

means for receiving a second portion of the transaction in lockstep with respect to the means for receiving the first portion;

means for identifying an error in one of the first and second portions of the transaction; and means for sending a notification signal to the means associated with the other of the first and second portions of the transaction responsive to identifying the error.

* * * * *